Nov. 28, 1967   J. R. DALE ET AL   3,354,860
MECHANICAL ISOLATION OF HYDROPHONES BY HYDROPLANES
Filed June 27, 1966

INVENTORS
JOHN R. DALE
HARRY R. MENZEL

ATTORNEY

3,354,860
MECHANICAL ISOLATION OF HYDROPHONES BY HYDROPLANES
John R. Dale, Willow Grove, and Harry R. Menzel, Hatboro, Pa., assignors to the United States of America as represented by the Secretary of the Navy
Filed June 27, 1966, Ser. No. 561,663
9 Claims. (Cl. 114—235)

ABSTRACT OF THE DISCLOSURE

An apparatus for the attenuation of motion induced spurious hydrophone signals resulting from cable vibrations, surface induced motion and other cable motions generally transferred to a terminal hydrophone is described. A hydroplane having a single hydrophone or a line-array attached thereto is constructed to hydrodynamically stream in a plane normal to the supporting cable and parallel to the fluid flow field for reducing spurious hydrophone signals.

---

The invention described herein may be manufactured and used by or for the Government of the United States of America for governmental purposes without the payment of any royalties thereon or therefor.

The present invention relates to hydrophone detection systems and more particularly to the mechanical isolation of hydrophones from flow induced cable vibrations.

The current interest in low frequency underwater acoustics, prompted by a need for improved underwater detection systems has uncovered serious problems caused by mechanical vibrations in hydrophone suspension systems. In general, hydrophones are suspended from a surface station by means of flexible cables which are excited into transverse vibrations due to transverse differential currents relative to the cable. These vibrations give rise to acceleration forces which are coupled to the hydrophones and cause spurious signals, which often are of such intensity, that they completely mask a target signal or interfere in such a way as to make target detection impossible. For example, a strong target signal may be in the order of 15 microbars peak-to-peak pressure variation while the level of vibrations or strumming signals may exceed 150 microbars for a hydrophone suspended from noncompliant cable.

Few, if any, hydrophone systems are immune from the strumming effects associated with cable vibrations because submerged cable suspensions are commonly used and they are inherently exposed to transverse differential flow currents. Typical hydrophone suspension systems include taut and slack cable moorings, drifting sonobuoy systems and towed systems. Also, hydrophones are suspended from a combination of compliant and noncompliant cables, with cable fairings along the noncompliant cable section. Additionally, isolation masses are employed for isolating induced surface motion. While these design variations are intended to isolate the hydrophones from cable vibrations and wave induced motion, their effectiveness has been limited since such devices introduce adverse drag characteristics. Although the basic cause and effect of cable vibrations has not been completely understood, it is well known that water flow relative to a cable will cause vibrations because of periodic hydrodynamic forces associated with the formation of shedding vortices. Thus, a basic requirement for cables to vibrate is a flow field relative to the cable.

Both moored and drifting hydrophone suspension systems have been employed for the detection of underwater targets. For the moored hydrophone suspension system, velocity profiles relative to the moored system are known to range between one-half knot to about three knots for world-wide ocean areas exclusive of the few localized severe current areas (i.e., Gulf stream, Kuroshio, and Agulhas currents). For the drifting system, a velocity gradient or differential flow is required for a flow field to exist relative to the cable. It is apparent that the deeper the hydrophone system is suspended from a drifting platform or surface station, the more chance there is of a differential flow. In particular, if the hydrophone is below the thermocline where the velocity decreases markedly, a large velocity gradient will result. For drifting hydrophone systems suspended at a depth of about 300 feet, differential maximum water flows of the order of one knot to two knots are though to be realistic. Even in quiescent water, the surface wind and wave transport may force the surface platform in such a direction as to cause a differential flow relative to the cable and hence cause cable strummings.

The general purpose of the present invention is therefore the attenuation of motion induced hydrophone signals resulting from cable vibrations, surface induced motion, and any cable motion that is conventionally transferred to a terminal hydrophone when there is a finite water velocity relative to the hydrophone.

An object of the present invention is therefore to provide an apparatus by which flow induced cable vibrations are isolated from a single or line-type hydrophone.

Another object of the invention is to isolated a hydrophone from cable strumming, surface induced motion, and any cable motion that is conventionally transferred to a terminal hydrophone when there is a finite water velocity relative to the hydrophone.

Still another object of the invention is the provision of adjusting the trim of the hydroplane for optimum streaming geometry for a relative range of water velocities.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
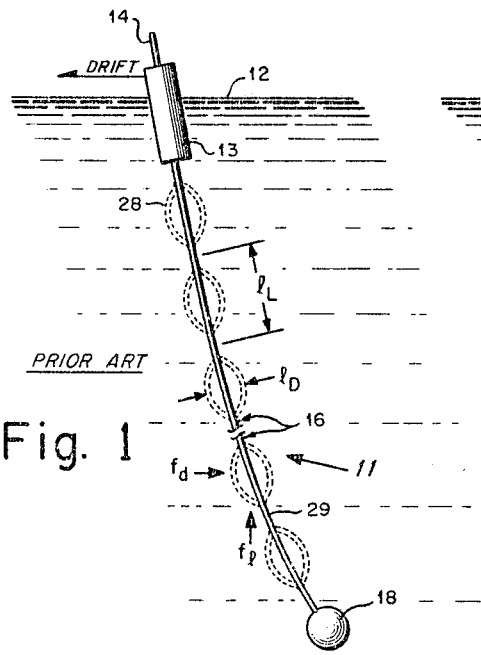
FIG. 1 illustrates a side elevation of a prior art single element hydrophone suspension system and the associated cable vibrations.

Referring now to the drawing, there is shown in FIG. 1 a prior art hydrophone system 11 suspended from a surface station 13 (equipped with a radio transmitter, not shown), which is floating on the surface of a sea 12, with a transmitting antenna 14 attached thereto. Surface station 13 may be typically a sonobuoy in which signals received from the hydrophone detection system, to be described hereinafter, are received and transmitted through antenna 14 to aircraft, ships or shore stations in the vicinity for detecting submarines or other underwater targets. Extending from the surface station 13 is a cable 16 which may comprise either compliant cable or a combination of compliant and noncompliant cables as discussed in our co-pending application Serial No. 554,939, filed May 31, 1966 for Vertical Stabilization of Line Hydrophone Arrays. A hydrophone element 18 is connected to the lower end of the cable 16 and provides omnidirectional detection characteristics. The hydrophone element 18 may include terminal weights for maintaining the cable 16 in an extended position.

The hydrophone system 11 is illustrated in a varying water velocity profile with the drift in the direction indicated, thereby causing the cable 16 and the hydrophone element 18 attached thereto, to stream in a direction opposite to the drift. The amount of streaming is defined as the scope of the hydrophone system; that is, the ratio of the cable length to the total depth of the cable. For example, if the length of cable 16 is 60 feet, and the total depth is only 40 feet, then the scope would be 1.50. If the cable 16 was in a perfectly vertical position, then the scope would be 1.00.

The scope of a hydrophone system is a function of the cable drag characteristics and the water velocity profile. With an increase of fluid drag on the cable, caused by an increased water velocity, the scope will increase and accordingly cause the hydrophone to be in shallower water than desired. Since the water velocity is an uncontrollable variable, it is essential that the cable drag characteristics be minimized so that a hydrophone can "listen" at a particular depth. For this reason then, it is necessary to maintain a minimum cable diameter and small size terminal weights.

Before proceeding with the description of the present invention, it is first necessary to discuss some of the parameters associated with cable vibrations and how they affect the hydrophone performance. To do this, reference is again made to FIG. 1 which illustrates typical cable vibrations encountered in a hydrophone suspension system with the resultant standing waves 28 and nodes 29 caused by the differential currents relative to the cable 16. These vibrations are in a plane transverse to the direction of flow, for the reasons indicated above, and the frequency thereof directly related to the fluid velocity and the cable diameter by the Strouhal number by the following equation.

$$f_L = \frac{S_t U}{d} \quad (1)$$

where $f_L$ is the vortex shedding frequency or oscillating lift frequency, $S_t$ is the Strouhal number, $U$ is the fluid velocity normal to the cable and $d$ is the cable diameter. Since the vibration is normal to the flow field, an oscillatory lift force illustrated as $f_l$ causes the cable 16 and hydrophone element 18 to be periodically lifted at a frequency equal to the alternating vortex shedding frequency $f_L$.

In addition to the vortex shedding frequency, oscillatory drag forces, $f_d$, acting at the rear of the cable and parallel to the flow field cause the cable to stream in a direction opposite to the drift. The frequency of the oscillatory drag forces, $f_D$ is termed the second harmonic and is characterized by the following equation:

$$f_D = \frac{2 S_t U}{d} \quad (2)$$

From the classical vibrating string system which has an infinite number of natural frequencies, the following string equation defining the natural undamped or slightly damped frequency ($f$) can be illustrated as follows:

$$f = \frac{1}{2 l_L} \sqrt{\frac{T}{W}} \quad (3)$$

where T is equal to the cable tension and W is equal to the virtual cable mass per unit length and $l_L$ is equal to the longitudinal standing wave length, that is, the length between two adjacent nodal points.

Cable vibration modes in a hydrophone suspension system can logically be assumed to be sympathetic with the forcing functions; that is, the frequency ($f$) in the foregoing Equation 3 is fixed at the appropriate Strouhal frequency. For a specific cable in a known field, then the only dependent parameter is the longitudinal standing wave length $l_L$ which will adjust in counterpoint with the forcing frequency. This is illustrated by combining the foregoing equations to define the vibrating mode lengths.

$$l_L = \frac{d}{2 S_t U} \sqrt{\frac{T}{W}} \quad (4)$$

$$l_D = \frac{d}{4 S_t U} \sqrt{\frac{T}{W}} \quad (5)$$

As can be seen from Equations 4 and 5, the traverse vibrating mode length $l_D$ is equal to one-half the longitudinal vibrating mode length $l_L$.

The above described cable vibrations cause the hydrophone element 18 to move in a vertical plane in accordance with the magnitude of the forcing frequency. This periodic displacement then causes acceleration forces to be exerted on the hydrophone element 18 and cause spurious output signals from the hydrophone of a frequency equal to that of the forcing frequency and of an amplitude proportional to the acceleration forces. An example will best illustrate this condition.

Assume that the forcing frequency is equal to 70 cycles per second and that the vertical displacement is equal to 0.001 inch. Then, from the equation of dynamic motion it can be found that the acceleration of a mass $a_m$ (in this particular case, the hydrophone) is equal to $\omega^2 R$ where $\omega$ is equal to $2\pi f$ and R is equal to the displacement amplitude. By employing this equation, it is found that the acceleration of the mass is approximately equal to 16.1 feet per second². Dividing this quantity by the gravitational forces (32.2 feet per second²) it can be seen that the hydrophone elements would be subjected to approximately 0.5G. Assume further that a typical hydrophone has a response characteristic of 25 millivolts per G, then an AC signal having a frequency of 70 cycles per second and an amplitude of 12½ millivolts would result from the aforementioned cable vibration.

Since it is desired to detect underwater sound sources or targets which produce output signals from the hydrophone elements in the order of tenths of millivolts, such a large signal would completely mask the target information. Accordingly, it can be appreciated that it is necessary to devise some technique whereby the effect of cable strumming is minimized.

Figure 2:
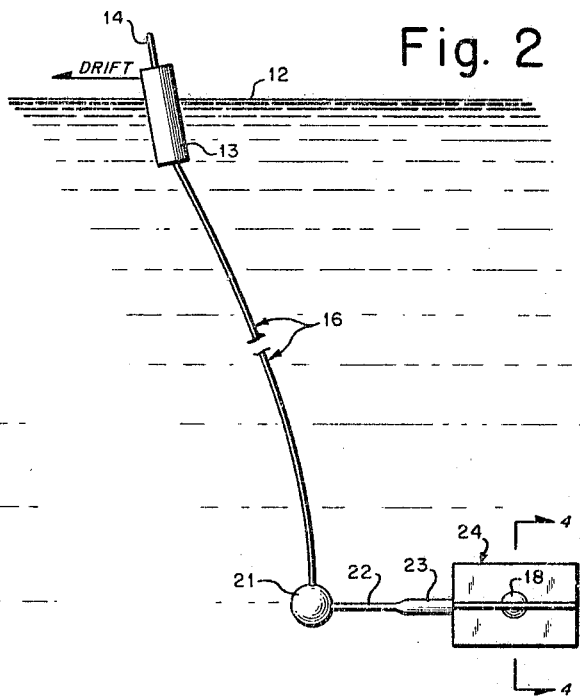
FIG. 2 illustrates a side elevation view of an embodiment of the invention with a single element hydrophone suspended from a sonobuoy.
Figure 4:
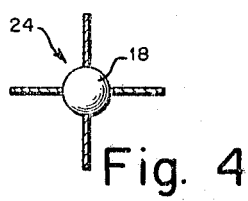
FIG. 4 shows a section of the hydrophone on the line 4—4 of FIG. 2 looking in the direction of the arrow.

Referring now to FIG. 2 which illustrates an embodiment of the present invention, cable vibrations are minimized by hydrodynamically extending a hydroplane 24 from a streamer cable in a plane parallel to the fluid flow thereby minimizing the vibrations occasioned by the cable 16. In particular, FIG. 2 illustrates a cable 16, subjected to similar vibrations of FIG. 1, but not shown, suspended from a surface station 13 and having a terminal weight 21 attached thereto. Hydrodynamically streaming from the terminal weight 21 is a short length of cable, approximately 10 feet in length, comprising a noncompliant cable section 22 and a compliant cable section 23. Attached to the end of the compliant cable section is a dual plane hydroplane 24 with a single hydrophone element 18 positioned along the longitudinal axis thereof. A cross-sectional view of the hydrophone 24 is illustrated in FIG. 4. Each plane is normal to and intersects the other along the longitudinal axis of the hydroplane.

While the hydroplane 24 is illustrated as streaming from the terminal weight 21, it is obvious that it may also be attached to some point on the cable 16 without departing from the spirit of the invention. Additionally, the particular hydroplanes described herein are merely illustrative of many types which may be employed.

The hydroplane 24 is designed such that the drag to net weight ratio of the combined hydrophone and hydroplane will ideally provide near normal streaming over a range of water velocities. This is accomplished by first designing the hydroplane to have a slightly positive buoyancy, then by adding lead shot or other weighting means, the hydroplane is made just slightly negatively buoyant until it weighs approximately one to two ounces in the water. Upon being subjected to a range of water velocities, the hydroplane will then stream near normal to the supporting cable. By varying the amount of weight, the trim of the hydroplane can be adjusted for optimum streaming geometry.

In this way, the vertical displacement of the weight 21, induced by the cable vibrations, is not transmitted to the hydrophone 18 as illustrated in FIG. 1, but rather is reduced by several orders of magnitude since the hydrophone is no longer subjected to the vertical displacement of the terminal mass 21 but rather remains in a substantially horizontal plane normal to the supporting cable 16 and independent of the motion of the terminal mass.

Figure 3:
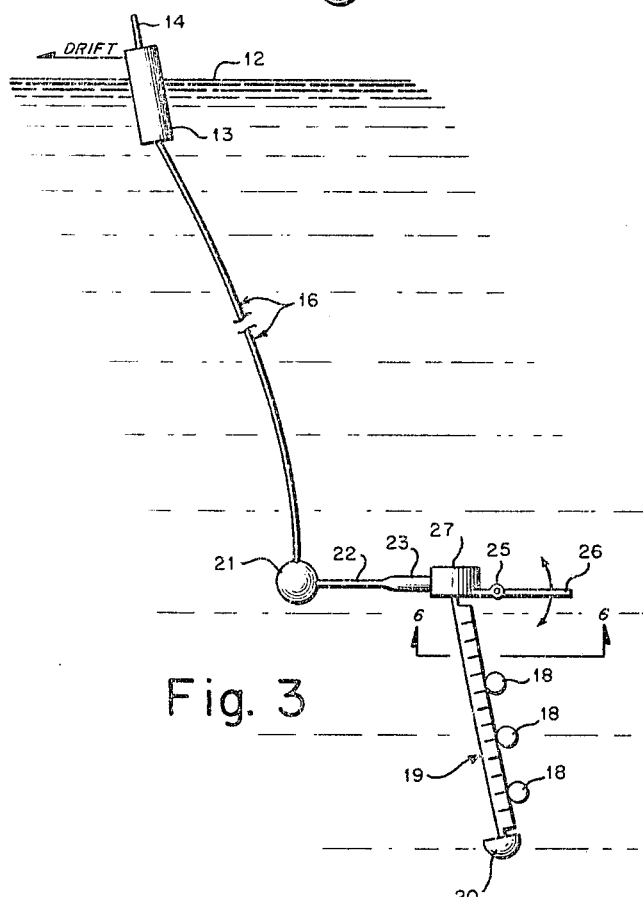
FIG. 3 illustrates a side elevation view of an alternative embodiment of the invention with a line-type hydrophone streaming from a sonobuoy suspension system.
Figure 5:
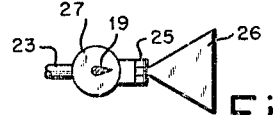
FIG. 5 shows a cross-section of a faired cable which may be used in the present invention.
Figure 6:
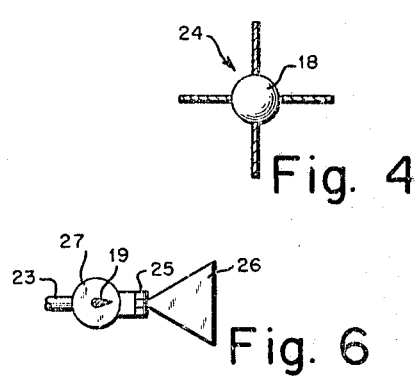
FIG. 6 shows a section of the line-type array on the line 6—6 of FIG. 3 looking in the direction of the arrow.

FIG. 3 illustrates an alternative embodiment of the invention in which a line-type hydrophone is suspended from a hydroplane for providing directional acoustic beam characteristics. In particular, FIG. 3 illustrates a hydroplane 27 comprising buoyant material such as molded cellular plastic with a flap 26 hinged to the hydroplane 27 by a hinge mechanism 25. A bottom view of the hydroplane 27 is illustrated in FIG. 6. Extending from the hydroplane 27 on a faired main tension member 19 (a cross-section of which is illustrated in FIG. 5) is a plurality of hydrophone elements 18 for providing directional detection characteristics. The faired cable 19 is slotted along its longitudinal length for providing flexibility of motion. A terminal weight 20 is attached to the other end of the main tension member 19 for providing a slightly negatively buoyant array; however, the sonobuoy suspension system, as a whole, is positively buoyant. Ideally, neutral buoyancy is desired for the array, however, due to the variations in salinity and the resultant changes in buoyancy, it is desirable from a practical standpoint to make the array negatively buoyant so that it may be used in varying sea conditions.

The vertical line-type hydrophone array illustrated in FIG. 3 and the single element hydrophone illustrated in FIG. 2, in addition to reducing the spurious signal level encountered as a result of cable strummings, also functions to minimize surface induced motions. This feature can best be illustrated by the following example.

Assume for the moment that the surface station 13 is subjected to a high sea state condition in which the surface station 13 is vertically displaced due to induced wave motion. Accordingly, in addition to the small amplitude, high frequency motion of the terminal weight 21, as a result of cable strumming, there is a low frequency, high amplitude motion as a result of the induced wave motion. This motion causes large excursions in the weight 21 and accordingly if the hydrophones are attached thereto as illustrated in FIG. 1, they would be subjected to a similar motion and hence produce output signals as a function of pressure variations. However, due to the near normal geometry of cable 22 relative to cable 16 (as a result of the length of cables 22 and 23), the vertical motion and the resultant pressure head change will be significantly reduced.

Additionally, in the case in which there is no relative drift rate and no induced wave motion, the hydroplane of FIG. 3 being negatively buoyant, will fall beneath the terminal weight 21 while still maintaining the vertical geometry of the array. During this time, the flap 26 will be in a substantially vertical position so that at the slightest indication of relative water velocity, the hydroplane 27 will tend to rise slowly thereby maintaining the substantially normal geometry. On the other hand, during high relative drift rates, the flap 26 will remain substantially horizontal and provide minimum resistance to the flow field, thereby maintaining the array again in a substantially normal geometry.

The description of the foregoing embdoiments has illustrated a technique for suspending hydrophones from a surface station for minimizing the spurious signals caused by cable vibrations and induced surface motion.

Obviously, many modifications and variations of the present invention are possible in light of the above teachings. It is therefore to be understood that within the scope of the appended claims, the invention may be practiced otherwise than as specifically described.

What is claimed is:

1. A hydrophone suspension system for reducing spurious hydrophone signals caused by cable vibrations and induced surface motion in a fluid field, said system comprising:
   first means suspending a cable below the surface of a sea; and
   second means hydrodynamically streaming a hydrophone on a hydroplane remote from said cable and substantially normal thereto, said second means including compliant coupling means for isolating said hydroplane from flow induced cable vibrations and wave induced vertical displacement of said cable whereby spurious hydrophone signals are reduced.

2. A hydrophone suspension system as recited in claim 1 wherein said second means hydrodynamically streaming a hydrophone comprises:
   a dual plane hydroplane having a first plane normal to and intersecting a second plane along a longitudinal axis forming a hydrodynamically stable platform for mounting said hydrophone thereon.

3. A hydrophone suspension system as recited in claim 2 wherein said first means suspending a cable comprises:
   a surface station freely floating on the surface of the sea, said station connected to one end of said cable and the other end extending below said surface; and
   weighting means connected to the other end of said cable for maintaining said cable in an extended position.

4. A hydrophone suspension system for reducing spurious hydrophone signals caused by cable vibrations and induced surface motion in a fluid field, said system comprising:
   a surface station freely floating on the surface of a sea;
   a cable having one end connected to said station;
   weighting means connected to the other end of said cable for maintaining said cable in an extended position below the surface of said sea;
   a dual plane hydroplane having a first plane normal to and intersecting a second plane along a longitudinal axis forming a hydrodynamically stable platform;
   a hydrophone mounted along the longitudinal axis of said hydroplane for providing omnidirectional acoustic characteristics, said hydrophone and hydroplane having a combined drag to net weight ratio to provide near normal streaming over a range of relative water velocities; and
   streamer means compliantly coupling said hydroplane to said cable for maintaining said hydroplane in a plane parallel to said fluid field over said range of relative water velocities, said streamer means isolating said hydrophone from flow induced cable vibrations and wave induced vertical displacement of said weighting means whereby spurious hydrophone signals are substantially reduced.

5. A hydrophone suspension system for reducing spurious hydrophone signals caused by cable vibrations and induced surface motion as a fluid field, said system comprising:
   means suspending a cable below the surface of a sea;
   means hydrodynamically streaming a buoyant hydroplane from said cable; and
   flap means hinged to said buoyant hydroplane and responsive to the relative velocity of said fluid field for maintaining said hydroplane substantially normal to said cable over a range of relative fluid velocities.

6. A hydrophone suspension system for reducing spurious hydrophone signals caused by cable vibrations and induced surface motion in a fluid field, said system comprising:
 means suspending a cable below the surface of a sea;
 means hydrodynamically streaming a buoyant hydroplane from said cable;
 flap means hinged to said buoyant hydroplane for providing lift therefor over a range of relative water velocities; and
 a line-type array connected to and extending in substantially a vertical plane from said buoyant hydroplane providing directional acoustic beam characteristics for detecting underwater sound sources.

7. A hydrophone suspension system as recited in claim 6 further comprising:
 means connected to said line-type array for maintaining a minimum scope over said range of relative water velocities.

8. A hydrophone suspension system as recited in claim 7 wherein said means suspending a cable comprises:
 a surface station freely floating on the sea, said station connected to one end of said cable and the other end extending below said surface; and
 weighting means connected to the other end of said cable maintaining said cable in an extended position.

9. A hydrophone suspension system as recited in claim 8 wherein said means hydrodynamically streaming a hydroplane further comprises:
 streamer means compliantly coupling said hydroplane to said cable for maintaining said hydroplane in a plane parallel to said fluid field over said range of relative water velocities.

References Cited

UNITED STATES PATENTS

| | | |
|---|---|---|
| 1,625,245 | 4/1927 | Dorsey. |
| 3,187,831 | 6/1965 | Smith _____ 340—12 X |
| 3,074,321 | 1/1963 | Draim et al. |
| 3,144,848 | 8/1964 | Knott et al. |
| 3,159,806 | 12/1964 | Piaseck. |

RICHARD A. FARLEY, *Primary Examiner.*

CHESTER L. JUSTUS, RODNEY D. BENNETT,
*Examiners.*

B. L. RIBANDO, *Assistant Examiner.*